INVENTORS
CLARON E. ANDERSON
GUY P. BAYLE
JOHN T. NISHIMI
BY
ATTORNEY

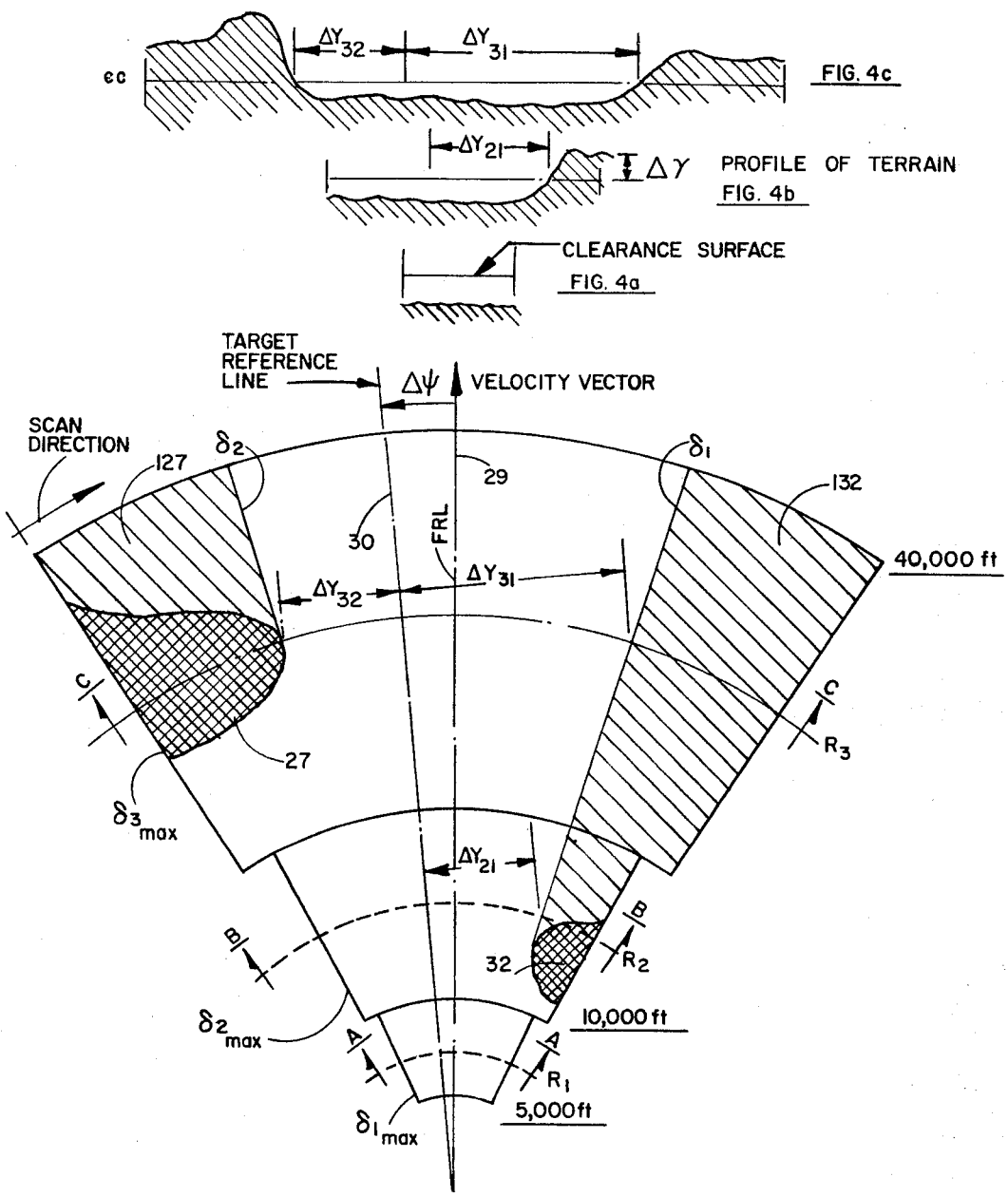

Dec. 26, 1967   C. E. ANDERSON ET AL   3,360,794
TERRAIN AVOIDANCE SYSTEM
Filed Aug. 24, 1966   11 Sheets-Sheet 4

FIG. 5

INVENTORS
CLARON E. ANDERSON
GUY P. BAYLE
JOHN T. NISHIMI
BY
ATTORNEY

FIG. 6

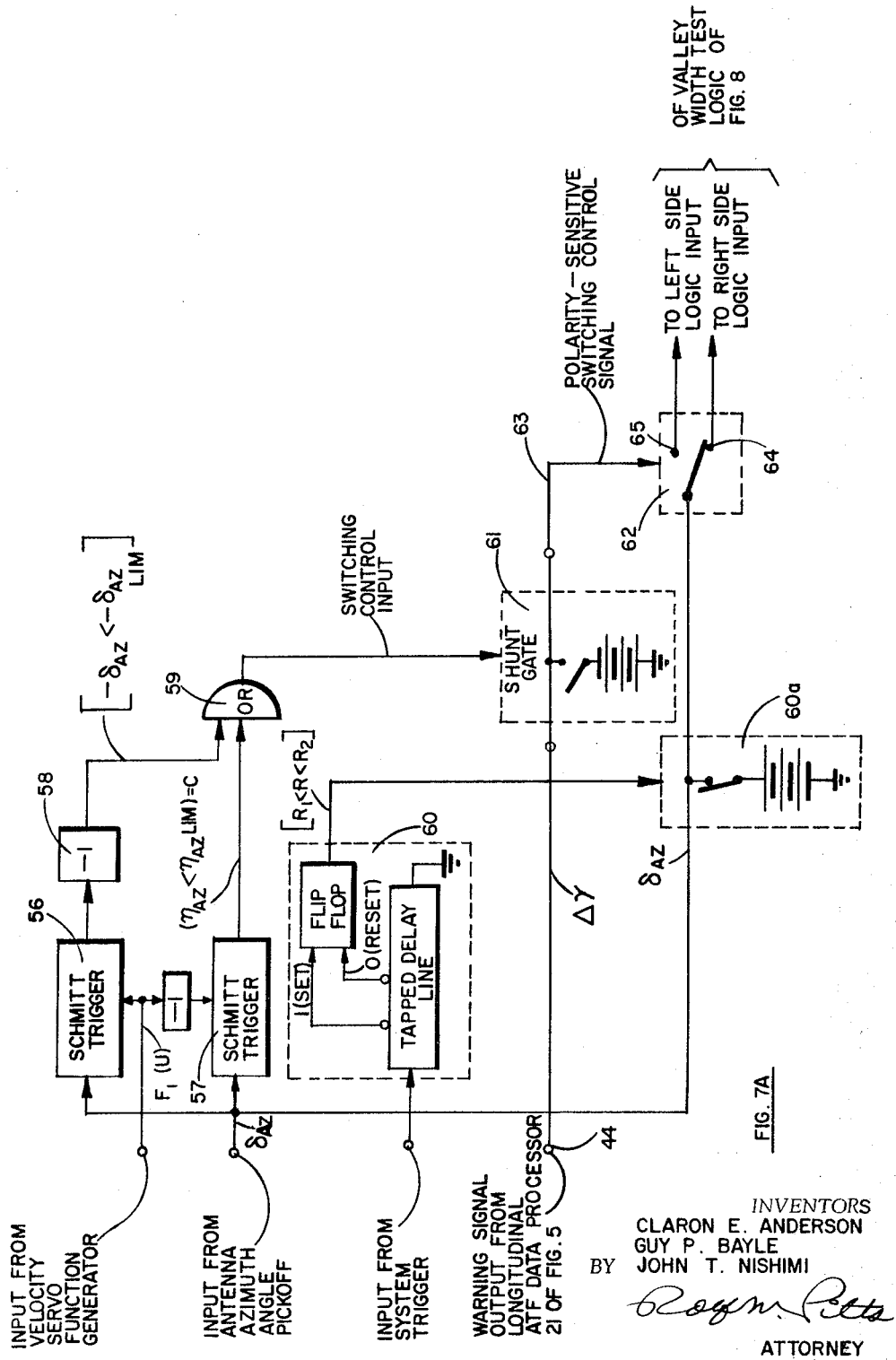

FIG. 7B

INVENTOR.
CLARON E. ANDERSON
GUY P. BAYLE
BY JOHN T. NISHIMI

ATTORNEY

INVENTORS
CLARON E. ANDERSON
GUY P. BAYLE
JOHN T. NISHIMI
BY
ATTORNEY

INVENTORS
CLARON E. ANDERSON
GUY P. BAYLE
BY  JOHN T. NISHIMI

ATTORNEY

United States Patent Office 3,360,794
Patented Dec. 26, 1967

3,360,794
TERRAIN AVOIDANCE SYSTEM
Claron E. Anderson, Fullerton, Guy P. Bayle, Orange, and John T. Nishimi, Westminster, Calif., assignors to North American Aviation, Inc.
Filed Aug. 24, 1966, Ser. No. 576,176
9 Claims. (Cl. 343—7)

ABSTRACT OF THE DISCLOSURE

Logic means in cooperation with an azimuthally-scanning, elevation-sensing terrain avoidance radar for generating lateral maneuvering signals, whereby unnecessary pitch "climp up-and-over" maneuvers of a utilizing vehicle tend to be avoided. The area or sector of surveillance is varied or limited in accordance with preselected lateral maneuvering limits of the utilizing vehicle, and range-weighted corridor data is tested against a minimum valley width criterion to determine a preferred vehicle course.

The arrangement and utilization of terrain avoidance signalling systems for the elevational or pitch maneuvering of an aircraft have been described in the prior art as means for allowing a military aircraft to effectively penetrate a hostile territory by flying a low altitude flight path and maneuvering as necessary to avoid terrain obstacles sensed at a limited vertical clearance distance below and along the vehicle flight path. Such a signalling system is described, for example, in U.S. Patent No. 3,165,740 issued Jan. 12, 1965, to W. E. Stoney for a Terrain Clearance Radar. A display indicator for an azimuthally scanning type system, as an aid in manually performing pitch and lateral maneuvers by aid of such systems, is described in U.S. patent application Ser. No. 80,491 filed Jan. 3, 1961, by A. H. Kazakevicius, et al., now U.S. Patent No. 3,333,263. An improvement to the terrain avoidance radar of Stoney is described in U.S. patent application Ser. No. 332,996 filed Dec. 20, 1963, by J. O. Anderson, et al., assignors to North American Aviation, Inc., assignee of the subject invention. Such improvement provides improved pitch maneuvering for a terrain-following mission as to better allow masking of an aircraft from a ground-based radar, and provides signals suitable for cooperation with the pitch channel of an automatic flight controller. However, such system does not provide means for automatic lateral maneuvering of a vehicle between terrain obstacles, lying along and about an intended flight path. Instead, such longitudinal flight control signalling means directs the aircraft to fly over such terrain obstacles, as to yet expose the vehicle to detection.

A human pilot may, by means of a display indicator of the type disclosed in the above described U.S. patent application Ser. No. 80,491, be enabled to manually control and laterally maneuver a vehicle so as to fly between sensed terrain obstacles, and thereby better mask the presence of his vehicle from ground based radars. However, such task requires a great deal of attention, resulting in pilot fatigue. Also, the performance of such lateral maneuvering function may cause the pilot to fly into a box canyon or otherwise be diverted from a primary mission objective of navigating his vehicle to the intended target. Accordingly, the performance of such a function must be coordinated with the navigation task of reaching a preselected target, which coordination function may overtax the pilot's abilities.

By means of the concept of the subject invention, means is provided for indicating the least lateral maneuver required relative to a selected heading direction for avoiding terrain obstacles sensed about the flight path of an aircraft.

In a preferred embodiment of the invention, there is provided an azimuthally-scanning, directionally-ranging system adapted for performing a terrain-following function in a space-borne vehicle. Such system includes data processing apparatus for providing lateral maneuvering signals for avoiding terrain obstacles sensed along and about a path of the vehicle. Such date processing apparatus comprises means responsive to the ranging system for providing a plurality of range-gated, azimuth limit-gated terrain warning signals, representing terrain obstacles lying within a preselectively maneuver-limited lateral sector about the heading of the vehicle. There is also provided means responsive to the first-mentioned means and to the associated ranges and directions of the sensed obstacles for generating signals indicative of a laternal clearance distance in excess of a preselected minimum lateral clearance distance between such obstacles.

In normal operation of the above-described arrangement, a lateral maneuvering command signal is generated, which is indicative of that heading direction having associated therewith at least the preselected minimum lateral clearance between the sensed obstacles and representing a minimum required deviation from a selected heading direction for avoiding such sensed obstacles. Normally, such selected heading direction would represent the direction of a selected target. Hence, the vehicle would be laterally maneuvered to avoid specific terrain obstacles while generally continuing to proceed toward the target; and would be made to climb over the terrain toward the target only in the event that no suitable valleys or terrain corridors existed among the terrain obstacles. Also, in laterally maneuvering the vehicle at a preselected minimum lateral distance from elevated terrain obstacles, such terrain may provide a background against which detection of even an exposed vehicle is difficult, thereby providing virtual masking of the vehicle. In this way, the vehicle is only minimally exposed in flying to the target. Accordingly, it is a broad object of the invention to provide an improved terrain avoidance system.

It is another object of the subject invention to provide a terrain avoidance system for low altitude control of a vehicle so as to reduce the probability of detection thereof while avoiding terrain obstacles.

It is still another object of the invention to provide means for laterally maneuvering a terrain-following vehicle so as to reduce the pitch attitude maneuvers associated with a terrain-following mission.

It is a further object of the invention to provide means for minimally laterally maneuvering a vehicle relative to a selected flight path for avoiding terrain obstacles along and about said flight path for increasing actual masking of the vehicle and avoiding detection thereof.

It is yet another object of the invention to provide signalling means for control of a vehicle at a preselected minimum lateral clearance distance from elevated terrain as to provide virtual masking of said vehicle for avoiding detection thereof.

These and other objects of the invention will become apparent from the following description, taken together with the accompanying drawings, in which:

FIGS. 2 and 3 are plan views of the geometry of a lateral terrain avoidance control problem which is solved by the concept of the invention.

FIGS. 4a, 4b and 4c are vertical sections taken along a respective radial line representing the mid range of each of the successive range increments depicted in FIG. 3.

FIG. 5 is a block diagram of a general arrangement for the lateral data processor of FIG. 1.

FIG. 6 is a block diagram of an automatic lateral guidance controller embodying the device of FIG. 5.

FIGS. 7a, 7b, 8, 9 and 10 are block diagrams of further details of the schematic arrangement of FIG. 5.

In the figures, like reference characters refer to like parts.

Figure 1:
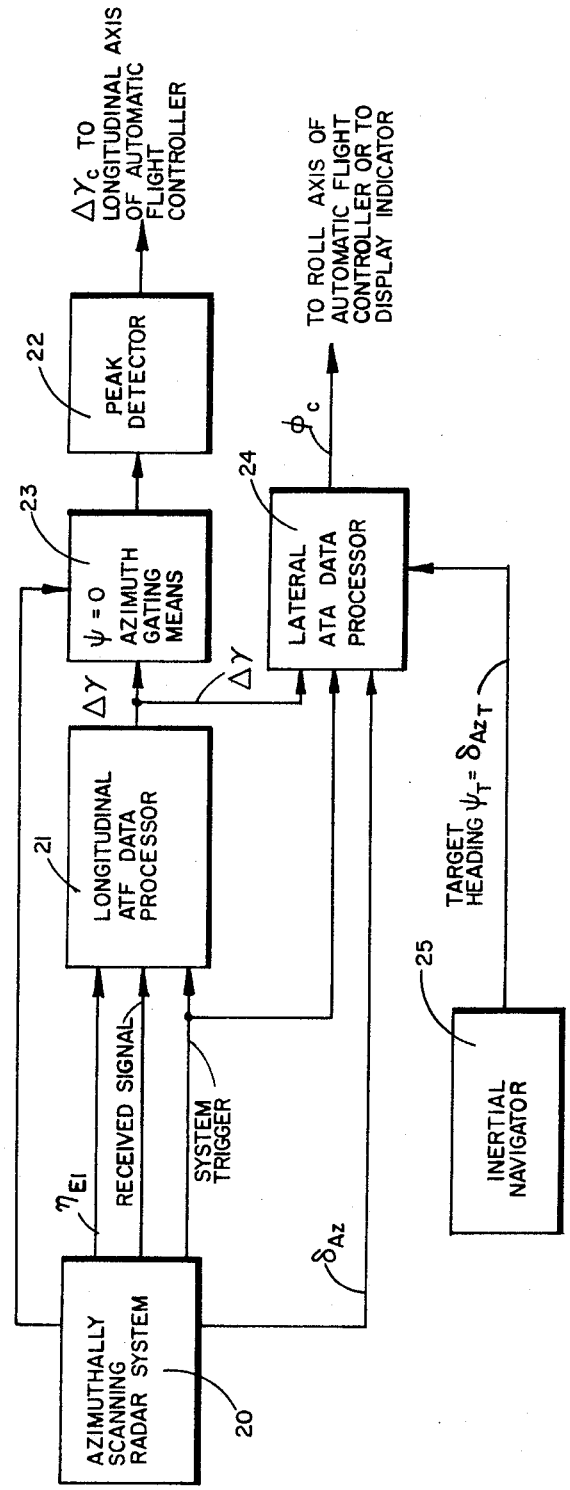
FIG. 1 is a block diagram of a directionally-ranging system in which the concept of the invention may be advantageously utilized.

Referring now to FIG. 1, there is illustrated in block form a diagram of a directionally-ranging system in which the concept of the invention may be advantageously utilized. There is provided an azimuthally-scanning radar system 20 in cooperation with a longitudinal terrain-following data processor 21 and gated peak detector 22 for generating signals indicative of a required vertical change in flight path angle of a maneuvering vehicle, whereby at least a preselected vertical clearance distance may be maintained under such vehicle. The construction and arrangement of azimuthally-scanning radar 20, longitudinal data processor 21 and peak detector 22 are known in the art, being described and illustrated for example, in the above described U.S. Patent No. 3,165,740 to Stoney, and also in U.S. patent application Ser. No. 221,653 filed Aug. 29, 1962, for a Monopulse Receiver System by James A. Moulton, assignor to North American Aviation, Inc., assignee of the subject invention; and in the above described U.S. patent application Ser. No. 332,996 filed Dec. 20, 1963. The azimuth-gating of the longitudinal data processor output of an azimuthally-scanning radar, in order to provide elevational steering signals, is noted particularly in the above described U.S. patent application Ser. No. 221,653. Accordingly, system 20, processor 21, peak detector 22 and azimuth gate 23 are shown in FIG. 1 in block form only for convenience in exposition.

There is further provided in FIG. 1 a lateral terrain avoidance data processor 24 responsively coupled to radar 20, longitudinal data processor 21 and a source 25 of a selected azimuth direction-to-be-steered for the generation of a roll command signal $\phi_c$ for lateral control, for example, of a roll-maneuvered vehicle. The concept of the invention, however, is not limited to being applied to roll-maneuvered vehicles, but is equally applicable to any laterally maneuverable vehicle.

Source 25 may be comprised of any known means for providing a selected azimuth direction and may include, for example, an inertial navigator for continuously indicating the direction $\delta_{azT}$ of a selected target of known location. The construction and arrangement of element 25 does not necessarily form a part of the inventive concept and, therefore, such element is shown in block form only.

In normal operation of the cooperation of lateral data processor 24 of FIG. 1, terrain warning signals $\Delta\gamma$ (from longitudinal processor 21) are preselectively range-gated and the range-gated signals are processed by azimuth limit-gated means to provide terrain warning signals representing terrain obstacles lying within a preselectively maneuver-limited lateral section about the heading of the vehicle. The obstacle ranges and directions associated with the gated warning signals are then further employed to generate signals indicative of a lateral clearance in excess of a preselected lateral clearance, from which that heading direction may be determined which has associated therewith at least a preselected minimum lateral clearance and representing a minimum required deviation from a selected heading direction for avoiding sensed obstacles. The nature of the maneuvering problem solved by means of the concept of the invention may be better appreciated by reference to FIG. 2.

Figure 2:
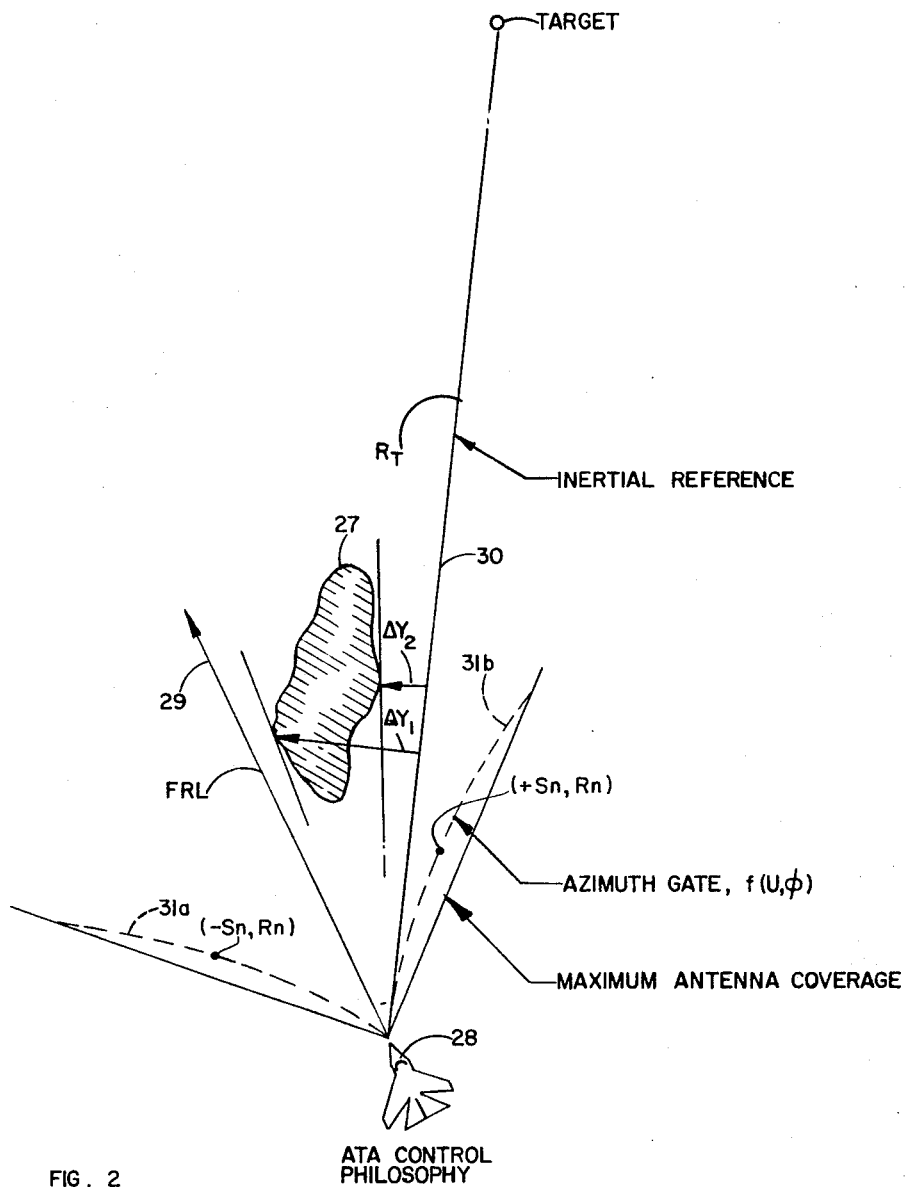

Referring to FIG. 2, there is illustrated in plan view of the geometry of one aspect of the lateral terrain-avoidance control problem solved by the concept of the invention. There is illustrated a terrain obstacle 27 lying forward of a laterally maneuverable vehicle 28 and proximate to the present flight path 29 thereof as to provide insufficient lateral clearance. The extremities of obstacle 27 are laterally displaced from a desired flight path 30, representing the direction to a selected target, by the dimensions $\Delta Y_1$ and $\Delta Y_2$. For the example selected, the terrain obstacle 27 may be cleared by laterally maneuvering to the right thereof, at a distance less than $Y_2$ to the left of course line 30, such maneuver representing a minimum change in course *relative to selected course line 30*. However, to attempt to so maneuver vehicle 28 would not be prudent where such a maneuver is beyond the maneuver-limits of the vehicle, which limits are indicated by curves 31a and 31b symmetrically displaced about FRL (flight reference line) 29.

Curves 31 may be derived in polar coordinate form relative to the FRL and position of vehicle 28 as representing radar azimuth look angles of increasing magnitude for successive radar ranges. As derived in U.S. patent application Ser. No. 432,791 filed Feb. 15, 1965, by D. E. Bennet, et al., now U.S. Patent 3,293,641, the expression for the range $R_n$ for the radar look angle limit $\delta_n$ associated with a point on the locus of such a curve, is a function of such look-angle, the vehicle velocity U, and a selected bank angle $\phi$ as follows:

$$R_n = \frac{2U^2}{g} \sin \delta_n \cot \phi \qquad (1)$$

where: $g$ = gravitational constant

For a given or fixed velocity $U_1$ and a maximum allowable bank angle ($\phi_{max}$), the expression of $R_n$ as a function of look-angle limit, $\delta_n$, may be rewritten as follows:

$$R_n = K \sin \delta_n \qquad (2)$$

where $$K = \frac{2U_1^2}{g} \cot \phi_{max}.$$

In other words, for a laterally maneuver-limited vehicle, the locus of the maneuver-limited flight path represents a range $R_n$ and an associated radar azimuth look-angle limit $\delta_n$, which limit increases with an increase in radar range. Thus, the terrain obstacles of interest to a laterally maneuverable vehicle are those occurring forward of the vehicle and on either side of the flight line thereof and representing a preselectively maneuver-limited lateral sector about the heading or FRL of the vehicle, as shown more particularly in FIG. 3.

Referring to FIG. 3 there is illustrated a further example of the lateral maneuvering problem solved by the invention for a vehicle having a nominal forward velocity of 780 ft./sec. and a bank angle limit of 45°. The plan view of FIG. 3 illustrates both the terrain obstacle 27 and the selected course line 30 lying to the left of FRL 29, corresponding to a lateral maneuver to the right, relative to the situation depicted in FIG. 2. In the new situation depicted in FIG. 3, an additional terrain obstacle 32 occurs to the right of the vehicle's FRL 29, within the maneuver-limited lateral sector under surveillance. Such lateral sector is illustrated for convenience as being comprised of a plurality of range increments, each having an associated azimuth look-angle limit, $\delta_{n_{max}}$, the azimuth limit for an associated range increment increasing with the median range, $R_n$, of successive range increments, substantially in accordance with the relationship of Equation 1:

$$|\delta_{n_{max}}| = \sin^{-1} \frac{R_n g \tan \phi_{max}}{2U^2} \qquad (3)$$

Also shown in the range-gated, azimuth look-angle limit-gated sectors of FIG. 3 are the shadow areas 127 and 132 which are masked by terrain obstacles 27 and 32, respectively.

A vertical section taken at the median range $R_n = R_1$, $R_2$ and $R_3$ of each of the three azimuth-limited range-increments, is respectively shown in FIGS. 4a, 4b and 4c, from which the development of the necessary logic requirements for a system mechanization may be appreciated.

In the first azimuth limit-gated range bin or range increment of FIG. 3 (corresponding to FIG. 4a), it is seen that there are no obstacles occurring above a selected vertical clearance plane, and hence no warning signal will result. Accordingly, logic means for such range bin (and described more fully hereinafter) would indicate a lateral command maneuver, directing that the vehicle be steered along the selected target track line 30, because there is no preferred course from the standpoint of terrain masking considerations. In other words, a lateral command of zero *relative to* selected course line 30 represents a maneuver to the left (of the vehicle FRL 29) for the situation illustrated in FIG. 3.

In this second azimuth limit-gated range bin of FIG. 3 (corresponding to FIG. 4b), it is seen that there are no terrain obstacles occuring above a selected vertical clearance plane to the left of the FRL 29 and selected course line 30. However, the left edge of a terrain obstacle 32 is viewed to the right of course line 30 at a lateral clearance $\Delta Y_{21}$, the 10's digit of the subscript 21 being indicative of the second range bin in which the obstacle 32 occurs, and the odd unit's digit being indicative of the occurrence of the left extremity of the sensed obstacle. Accordingly, two tests must be performed on such lateral clearance data $\Delta Y_{21}$ at the average range, $R_2$: (1) the magnitude of the lateral clearance (of target line 30) must be compared against a preselected or minimum desired clearance $Y_0$ to determine its adequacy, and (2) verify that the sense of the peak-detected longitudinal warning signal $\Delta \gamma$ (asoscited with such lateral clearance) is negative, or indicative of a desired terrain "valley." If both such conditions are satisfied, then the lateral command maneuver indicated from logical considerations of the second range bin in FIG. 3 would be zero relative to course line 30. If, however, insufficient lateral clearance of obstacle 32 (relative to course line 30) were indicated, then the sense of the difference would be employed to generate a lateral maneuver, thereby biasing such direction signal command to the left of course line 30.

In the third azimuth limit-gated range bin of FIG. 3 (corresponding to FIG. 4c), it is seen that there is a terrain obstacle or a radar shadow therefrom occurring about the mid range $R_3$ on either side of selected course line 30. The right edge of the left-hand terrain obstacle 27 and its shadow 127 occur at an azimuth direction $\delta_2$ and having a lateral displacement of $\Delta Y_{32}$ at the midrange $R_3$. The left edge of right-hand shadow 132 occurs at an azimuth direction $\delta_1$ and demonstrates a midrange lateral displacement of $\Delta Y_{31}$, relative to course line 30. Such shadows are provided in the system of FIG. 1 by a peak-detecting process performed for each azimuth direction, as described more fully in U.S. Patent application Ser. No. 372,455, filed June 4, 1964, by A. Kazakevicius, et al., now abandoned.

Such lateral clearances, $\Delta Y_{31}$ and $\Delta Y_{32}$, may be estimated from the radar data, using small angle approximations, as:

$$\Delta Y_{3c} = n_{3c} R_3 \quad (4)$$

Although such estimates may appear to be less than accurate, the errors may be made tolerable where sufficient numbers of range bins of sufficiently small range increments are used. Further, because of the lesser hazard constituted by the more distant terrain obstacles, larger errors are tolerable and hence larger range increments may be employed for successively distant range bins of FIG. 3. Flight tests have been successfully conducted of a system embodying the concept of the invention and utilizing the three exemplary range bins depicted in FIG. 3.

The right side and left side lateral clearance data $\Delta Y_{31}$ and $\Delta Y_{32}$ of the third range bin in FIG. 3 are similarly tested as was the data of the second range bin for compliance with certain criterion: (1) valley width or minimum lateral clearance test $|Y_{31}+Y_{32}| \geq 2Y_0$, and (2) the existence of a negative sense of $\Delta \gamma_n$, the vertical maneuver warning signal. Where both logic conditions are satisfied, for the sensed left-hand and right-hand terrain conditions of the third range bin, then a lateral command maneuver signal ($Y_{3c}=0$) would be generated, directing that the vehicle be steered along the selected target course line 30 (corresponding to the situation of range bin 1). Where, however, the magnitude of one of $\Delta Y_{31}$ and $\Delta Y_{32}$ is less than the desired clearance ($Y_0$) while the sum of them yet complies with the width test, $|Y_{31}|+|Y_{32}| \geq 2Y_0$, then the lateral maneuver command $Y_{3c}$ will not be zero (relative to course line 30), but instead will represent that sense and magnitude necessary to provide the preselected minimum lateral clearance relative to the associated offending terrain obstacle. For example, where $|\Delta Y_{32}| < Y_0$, then $Y_{3c}$ equals $(\Delta Y_{32}+Y_0)$. (Note that $Y_0$ is positive but that in the example of FIG. 3, $Y_{32}$ is of the negative sense, indicating the left sense; and hence the resulting sense of $Y_c$ would be positive, indicating a maneuver to the right.) In this way the vehicle, while laterally skirting such obstacle, yet employs its proximity for at least virtual masking, if not actual masking, of the vehicle's presence. For example, where the vehicle's track is across the field of view of a ground based radar, rather than moving radially thereto, no Doppler effect will be observed from which to break out, or distinguish, the radar returns from such vehicle relative to the terrain background. (Moreover, because the vehicle's own radar is a substantially forward-looking, directional radar, detection of the vehicle's own radar transmission by such ground radar is not likely during such virtual masking and is essentially impossible during actual masking.)

In the example represented by the terrain model of FIG. 3 and FIGS. 4a, 4b and 4c, a final logic stage would consider the several lateral maneuver commands provided by the several range-bin solutions, ($Y_{1c}=0$, $Y_{2c}=0$, and, say, $Y_{3c}=\Delta Y_{32}+Y_0$) and select the sense and magnitude of that one as a vehicle lateral maneuver reference $Y_n$ which is largest in magnitude. In this way, the least deviation from the selected course line is suffered in laterally maneuvering the vehicle to safely effect masking.

Where, however, there is no penetration of a selected vertical clearance reference by the terrain obtacles in any of the range bins (all values of $\Delta \gamma$ are negative) then a final logic choice for a lateral maneuver would be $Y_n=0$ (relative to course line 30). Also, in a case where the terrain penetrates the vertical clearance reference, and such penetration extends across the lateral sector of a given range bin (all values of $\Delta \gamma_n$ therein are positive) the lateral maneuver logic signal for such range bin is $Y_n=0$. In other words, for either no terrain penetration or complete terrain penetration, the lateral maneuver command is $Y_n=0$, indicating that either no "valley" exists or else that there are no isolated terrain prominences to be avoided by lateral maneuvering (in which latter case the vehicle must climb up and over the terrain).

It is to be understood that the "valley" sought by such lateral maneuvering logic is not necessarily a horizontal one extending for the full detection range of the azimuthally scanning, forward-looking radar. Instead, such valley represents a terrain depression relative to the vertical clearance reference employed by the longitudinal data processor 21 of FIG. 1. Such vertical clearance reference is not necessarily a horizontal plane located at a selected distance below the vehicle's altitude; but is preferably oriented relative to the vehicle's flight path and may be elevated thereabove at extended ranges, in order to "mask" distant terrain from the vehicle's radar, in order to avoid a premature "fly-up" maneuver. Such concepts are more fully explained in the above-noted patent application Ser. No. 332,996. The effect of such a range-programming of the vertical clearance reference is to determine whether a given terrain situation represents a "valley" from the standpoint of vertical maneuvering requirements, and which may be employed by engaging in a suitable lateral maneuver.

A general schematic arrangement for mechanizing such lateral maneuvering logic considerations is shown in FIG. 5.

Referring now to FIG. 5, there is illustrated in block diagram form a general arrangement of the lateral data processor of FIG. 1. There is provided a plurality of range-gating means, each responsive to the system trigger of the radar system 20 of FIG. 1 for gating-on the terrain-warning receiver signal output (of processor 21 of FIG. 1) during a mutually exclusive interval of time, such intervals corresponding to range increments representing successive ranges sensed by ranging system 20 (of FIG. 1). Such ranging means may, for example, be comprised of a first, second and third range gate 41, 42 and 43, each having a signal input commonly adapted to be responsively coupled to the signal output from processor 21 by means of a common input terminal 44, and further having a "1," or set, input coupled to the system trigger by a first preselected time-delay provided by a tapped delay line 45, and a "0," or reset, input coupled to a second delay, also provided by tapped delay line 45. Such second delay is incrementally greater than the first delay by an amount corresponding to a desired range increment, the average of such two delays corresponding to a desired median range-to-be-gated, $R_n$. The "1" set input of each succeeding range gate may employ the same delay tap as that employed by the "0" reset input of the preceding range gate, in order to conveniently avoid a gap over the entire range interval so gated. For example, the "1" set of gate 42 may employ the same tap as that for the "0" reset of gate 41, and the "1" set of gate 43 may employ the same tap as the "0" reset of gate 42. The construction and arrangement of range-bin sampling means such as tapped delay lines and signal gates are well known in the art and, therefore, gates 41, 42 and 43 and tapped delay line 45 are shown in block form only.

There is also provided in FIG. 5 a like plurality of azimuth limit gates 46, 47 and 48 as range gates, each azimuth limit gate associated with a mutually exclusive one of the range gates and being responsive to the antenna look angle of scanning system 20 (of FIG. 1) for providing azimuth look-angle signals which are magnitude limit-gated in accordance with the following relationship:

$$\delta_n = \delta_{az} \text{ for } \delta_{az} < \delta_{n_{max}}. \quad (5)$$

and $$\delta_n = \delta_{n_{max}} \text{ for } \delta_{az} \geq \delta_{n_{max}}. \quad (6)$$

where $\delta_{n_{max}}$ for the associated mid range $R_n$ of a corresponding range gate is preselected in accordance with the relationship of Equation 3.

The outputs of a corresponding range-gate and azimuth-limit gate set are fed to an associated one of gated signal processors 49, 50, and 51 for generating lateral maneuver signals indicative of a lateral clearance distance in excess of a preselected minimum lateral clearance between sensed terrain obstacles. (Each of processors 49, 50 and 51 include peak detection means responsive to the longitudinal terrain warning signal $\Delta\gamma$ for peak detection thereof at each scanned azimuth direction for determining those azimuth directions in which vertically protruding obstacles or shadows thereof exist. Such shadows would be manifested in the peak detected outputs of the longitudinal data processors 21 of FIG. 1.) For example, processor 49 is responsively coupled to gates 41 and 46, processor 50 coupled to gates 42 and 47, and processor 51 coupled to gates 43 and 48. The outputs of processors 49, 50 and 51 are each indicative of the least lateral maneuver required to employ an acceptably wide "valley" occurring in the correspondingly sampled range bin. A final logic stage 52 is responsively coupled to the output of logic processors 49, 50 and 51 to select the largest $Y_c$ of the several lateral maneuver commands generated ($Y_{1c}$, $Y_{2c}$, $Y_{3c}$) as that least maneuver required in order to effectively utilize a "valley" occurring within the forward range interval under surveillance.

Figure 6:
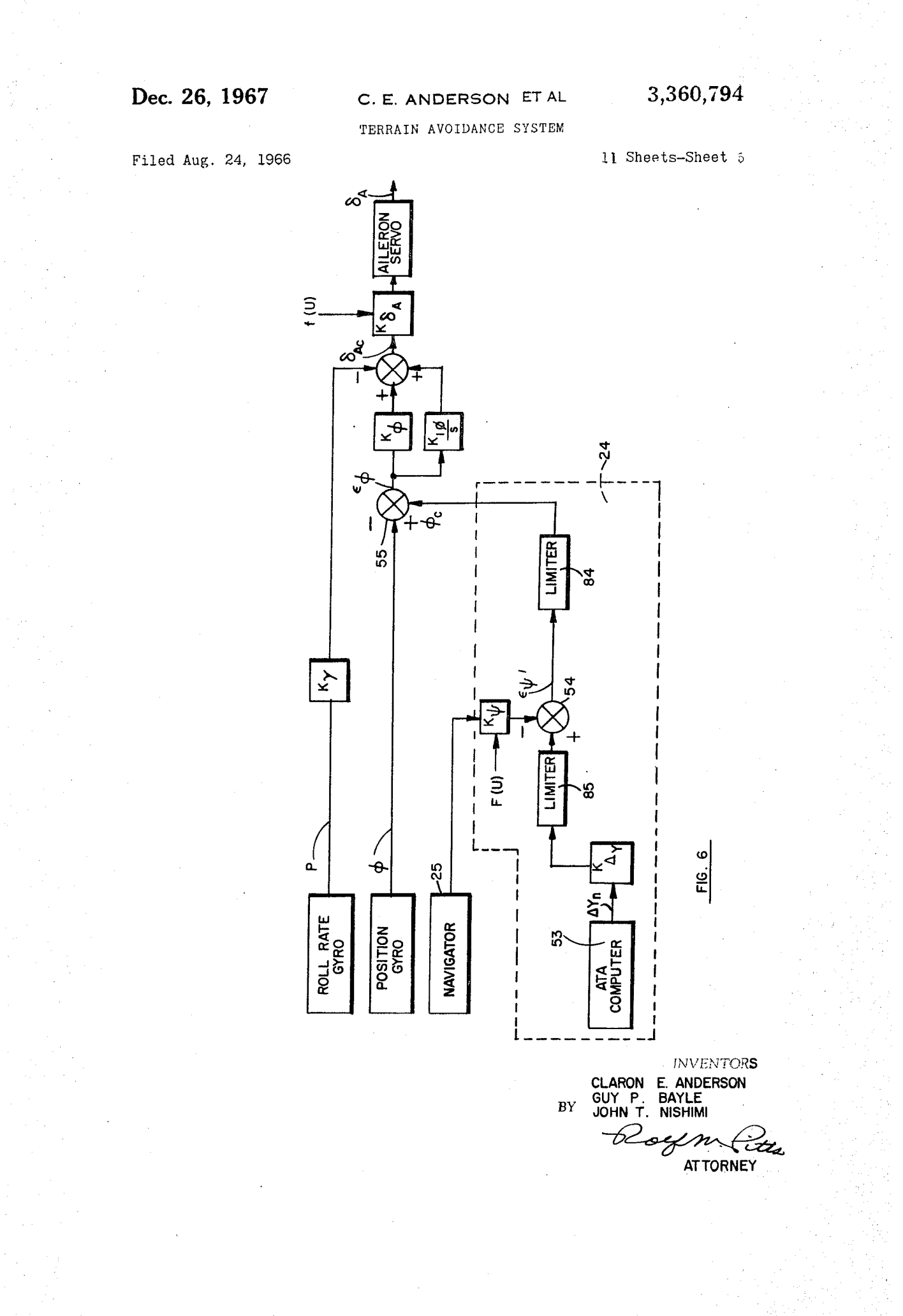

The lateral maneuver command signal generated by the computing arrangement of FIG. 5, may then be utilized in providing a roll-reference for a roll-maneuvered vehicle, as shown more particularly in FIG. 6.

Referring to FIG. 6, there is illustrated the lateral axis of a flight control system, known in the art per se and arranged for cooperation with the data processor 24 of FIG. 1, which processor includes the lateral deviation computer of FIG. 5, shown in FIG. 6 in block form as element 53. The output of element 53 is combined with that output of navigator 25 representing the direction to a selected target by first signal combining means 54, thereby biasing such direction signal.

Such biased directional signal output of element 54 is then fed as a roll command signal to the summing input 55 of a conventional closed loop roll controller of a roll-maneuvered vehicle. A first signal limiter or saturating amplifier stage 84 is interposed between the output of element 54 and the associated input to element 55 to prevent the roll controller from attempting roll maneuvers exceeding the safe bank angle, or roll maneuver, limits of the utilizing vehicle. A second signal limiter 85 is interposed between the output of computer 53 and the associated input of element 54 to limit the bias applied to the heading deviation signal, whereby the controlled vehicle may be prevented from attempting to fly in a circle in response to excessively large biases such as, for example, those larger than the turning diameter (twice the turning radius) of the utilizing vehicle.

A more detailed illustration of the schematic arrangement of FIG. 5 is shown in the block diagrams of FIGS. 7, 8, 9 and 10. In such detailed arrangement, logic means is provided for determining the directions of the left and right edges of a prominence (or, alternatively, the right and left sides, respectively, of a valley), employing a unipolar azimuthal scanning direction. In other words, the radar data obtained during only one direction of scanning (say, left to right) is employed. In this way, left and right edges of a terrain prominence may more easily be distinguished; and the logic, for distinguishing the occurrence of a valley from that of a hill intermediate such left and right edges, may be simplified. Such logic scheme and the associated notation therefor may be understood by reference to FIGS. 11a and 11b.

Figure 11A:
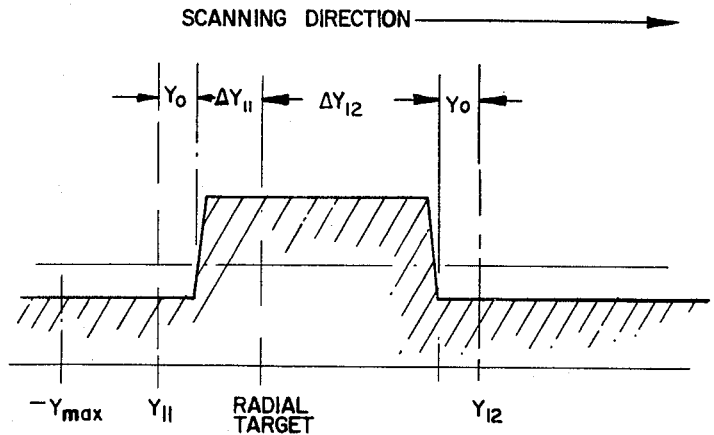
FIGS. 11a and 11b represent an obstacle and a valley, respectively, and illustrate the application of the logic notation employed.

Referring to FIG. 11a, there is illustrated a transverse profile of terrain viewed in a selected range bin by scanning from left to right. The existence of the illustrated obstacle being determined from the sequential scanning by the positive-going sense of the $\Delta\gamma$ (longitudinal terrain warning) signal, at $-\Delta Y_{n1}$ (the negative value indicating a left sense, as illustrated in FIG. 11a), followed by a subsequent negative going sense of the change of the $\Delta\gamma$ signal at $+\Delta Y_{n2}$, the first character $n$ referring to the range bin of interest, the odd second character referring to the left edge of the prominence, and the even number the right edge. The desired right edge clearance $Y_{n2}$ is equal to $(\Delta Y_{n2}+Y_0)$, while the left edge clearance $Y_{n1}$ is $(\Delta Y_{n1}-Y_0)$. In other words, the lateral dimension to be avoided lies therebetween, and is indicated by a negative sense of the difference between the two clearance dimensions, $Y_{n1}$ and $Y_{n2}$:

$$(\Delta Y_{n1}-Y_0)-(\Delta Y_{n2}+Y_0)$$
$$=(\Delta Y_{n1}-\Delta Y_{n2})-2Y_0 \geq 0 \quad (7)$$

Note that $\Delta Y_{11}$ is of the negative sense, and $\Delta Y_{12}$ is of the positive sense, as illustrated in FIG. 11a.

Figure 11B:
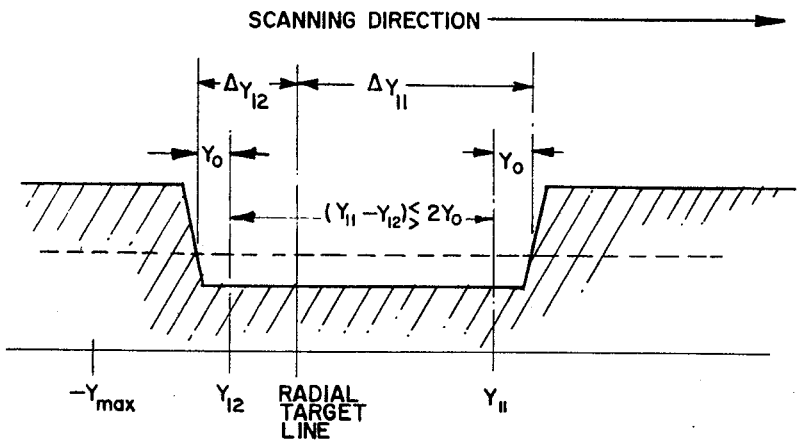

Referring to FIG. 11b, there is illustrated a transverse profile of a valley viewed by left-to-right scanning. The right edge of a terrain prominence (at the left side of the valley) is again indicated by the negative-going sense of the change in $\Delta\gamma$, which occurs at $-\Delta Y_{n2}$, and is followed by a positive-going sense of the change in $\Delta\gamma$ at $+\Delta Y_{n1}$, corresponding to a left edge of a prominence (at the right side of the valley). The desired left edge and right edge clearance are: $(+\Delta Y_{n1} - Y_o)$ and $(-\Delta Y_{n2} + Y_o)$, respectively. In other words, the clearance notations are the same as those for FIG. 11a; only the illustrated senses of $Y_{n1}$ and $Y_{n2}$ are observed to be reversed in the situation depicted in FIG. 11b. Applying the test of Equation 7 may now result in a difference dimension of positive sense for a valley which passes a minimum "valley width" test for $(Y_{n1} - Y_{n2})$:

$$(\Delta Y_{n1} - Y_o) - (\Delta Y_{n2} + Y_o)$$
$$= (+\Delta Y_{n1} - \Delta Y_{n2}) - 2Y_o \geq 0 \quad (7a)$$

Such positive sense results for a valley where:

$$(+\Delta Y_{n1} - \Delta Y_{n2}) \geq +2Y_o \qquad (8)$$

noting the $\Delta Y_{n1}$ is of the positive sense and $\Delta Y_{n2}$ is of the negative sense, as illustrated in FIG. 11b.

With the foregoing concepts in mind, the detailed mechanization of FIGS. 7a, 7b, 8, 9 and 10 may the better be enabled to be appreciated.

Referring to FIG. 7a, there is illustrated in block diagram form an embodiment of the azimuth gating and ranging gating means associated with a single one of the exemplary three sets of azimuth- and range-gated signalling channels of FIG. 5.

There is provided clock interval means 60 responsive to the system trigger (of the radar system 20 of FIG. 1) for providing periodic clock signals indicative of a range bin or radar range time interval to be sampled. The output of range interval gating means 60 is applied as a gate control input to a range interval gate 60a for gating the azimuth angle of, alternatively, a unidirectionally-scanning antenna or those antenna angles associated with a preselected sense (say, left-to-right) of the scanning direction of an antenna of the radar system of FIG. 1. Gate 60a is shown in the normally unexcited or shunt condition, in which case terminal $\delta_{az}$ is shunted across a negative bias, representing an initial value from which the unipolar rate-sensed gated azimuth scanning signal progresses (say, a left-most value for a left-to-right scanning azimuth signal). The purpose of such bias state of gate 60a is to avoid causing a response by the peak detectors, used elsewhere in the system, during such state of gate 60a, as will become more fully apparent from the description of FIG. 8.

There is also provided in FIG. 7a a first and second Schmitt trigger 56 and 57 commonly responsive to the unipolar rate-sense gated azimuth angle signal $\delta_{az}$. Each of Schmitt triggers 56 and 57 is further responsive to a reference signal corresponding to a preselected one of the oppositely poled azimuth angle limits ($\mp \delta_{n_{max}}$) of the range bin with which they are associated. In this way, each provides a two-state output indicative of whether or not such limit is exceeded. Such angle limits are functions of the forward velocity of a utilizing vehicle, as well as of a preselected median range, $R_n$. Therefore, where such forward velocity is expected to vary substantially, a signal indicative of such angle limit may be generated by a function generator driven by an airspeed servo, as is well understood in the art. An inverter 58 may be employed with one of the triggers in order to provide a common signal state from each for azimuth angles within the limits, $-\delta_{n_{max}} < \delta_n < +\delta_{n_{max}}$, as is understood in the art.

These logic state signals are utilized by a OR gate 59. A signal state output of gate 59, corresponding to the occurrence of an antenna look-angle within the preselected look angle limits, is applied as a switching control signal to operate a switch 61 in a second one of two states to azimuth limit gate the $\Delta \gamma$ warning signal (applied to terminal 44). In the absence of such state of the input to gate 59, a first state of switch 61 provides a bias signal corresponding to a $+\gamma$ and indicative of a simulated terrain obstacle.

The azimuth gated $\Delta \gamma$ warning signal or bipolar output of switch 61 is applied as a two-state logic control input to a polarity sensitive double throw switch 62, the armature terminal of which is coupled to the output of a source 60a of range-gated direction signals. In this way, switching control signals of a preselected sense on line 63 and corresponding to a terrain prominence region, switch the direction signal inputs to switch 62 to a preselected one of the output terminals thereof, which output terminal thus corresponds to a prominence region. A change in the switching control signals to the opposite sense (on line 63), during a left-to-right antenna scan, corresponds to the occurence of the right edge of the prominence or the left side of a valley (as described in connection with FIGS. 11a and 11b), and therefore the second output terminal 65 (of switch 62) associated with such sense, is also indicative of the right edge of a prominence. Further, where switch 62, being in the $-\Delta \gamma$ state, subsequently switches to the first or $+\Delta \gamma$ state during the unidirectional antenna scan, such subsequent change of state is obviously indicative of the right side of the valley (or the left edge of another prominence). In other words, the output on terminal 64 will be employed to determine $\Delta Y_{n1}$ and the output on terminal 65 will be employed to determine $\Delta Y_{n2}$, as shown more particularly in FIG. 8.

Although element 62 is shown as a double throw switch, it is clearly apparent that such device may be further comprised of two single-pole shunt switches driven in mutually opposite states, each located at one of the two outputs of switch 62 for providing an associated negative bias in the associated output terminal 64 or 65 of switch 63, when the other of terminals 64 and 65 is connected by switch 62 to the output of switch 60a. The purpose of such shunt switching bias is to avoid the excitation of an associated one of the peak detectors 66 and 67, similarly as was explained in connection with shunt switch 60a.

Hence the arrangement of FIG. 7a combines a range-interval gated azimuth signal and an azimuth interval gated terrain warning signal to provide range-gated, azimuth-gated terrain-warning lateral-direction signals, which may be employed for further processing. However, such signal gating combination is exemplary, only, and other gating combinations may be employed such as the alternative mechanization shown in FIG. 7b. In such alternative arrangement, the range gate 60a is employed to gate the warning signal ($\Delta \gamma$) on terminal 44 prior to the application of such warning signal as an input to azimuth limit gate 61. In other words, the antenna azimuth signal ($\delta_{az}$) is not range gated prior to application thereof as an input switch 65; instead the terrain warning signal, employed as a switching control input for switch 62, is both range-interval gated and azimuth-angle gated in accordance with that set of range interval and azimuth limits corresponding to a preselected range bin.

In order that switch 62 (in the arrangement of FIG. 7b) not be inappropriately actuated by a switching control input on line 63 when logic gate 61 is unshunted, during the unexcited (or shunted) mode of logic switch 60a, the shunt mode of switch 60a provides a negative bias (corresponding to the simulated absence of a terrain prominence); also, a peak detector 60b is interposed between the output of switch 60a and the signal input to switch 61 so that the warning signal input to switch 61 will be indicative of only that warning condition, if any, occurring within the range-gated interval of interest. Such detector also provides impedance isolation between shunt gates 60a and 61 during concurrent shunted conditions thereof.

Accordingly, the arrangements of FIGS. 7a and 7b provided alternative means for effecting combined range-interval gating and azimuth-interval gating of azimuth direction signals associated with the edges of a scanned terrain discontinuity. Such alternative specific arrangements for utilization in the schematic arrangement of FIG. 5, are understood to be exemplary only, other alternate schemes, being equally suitable for providing gated azimuth signals for further signal processing in accordance with the arrangements of FIGS. 8 and 9.

Figure 8:
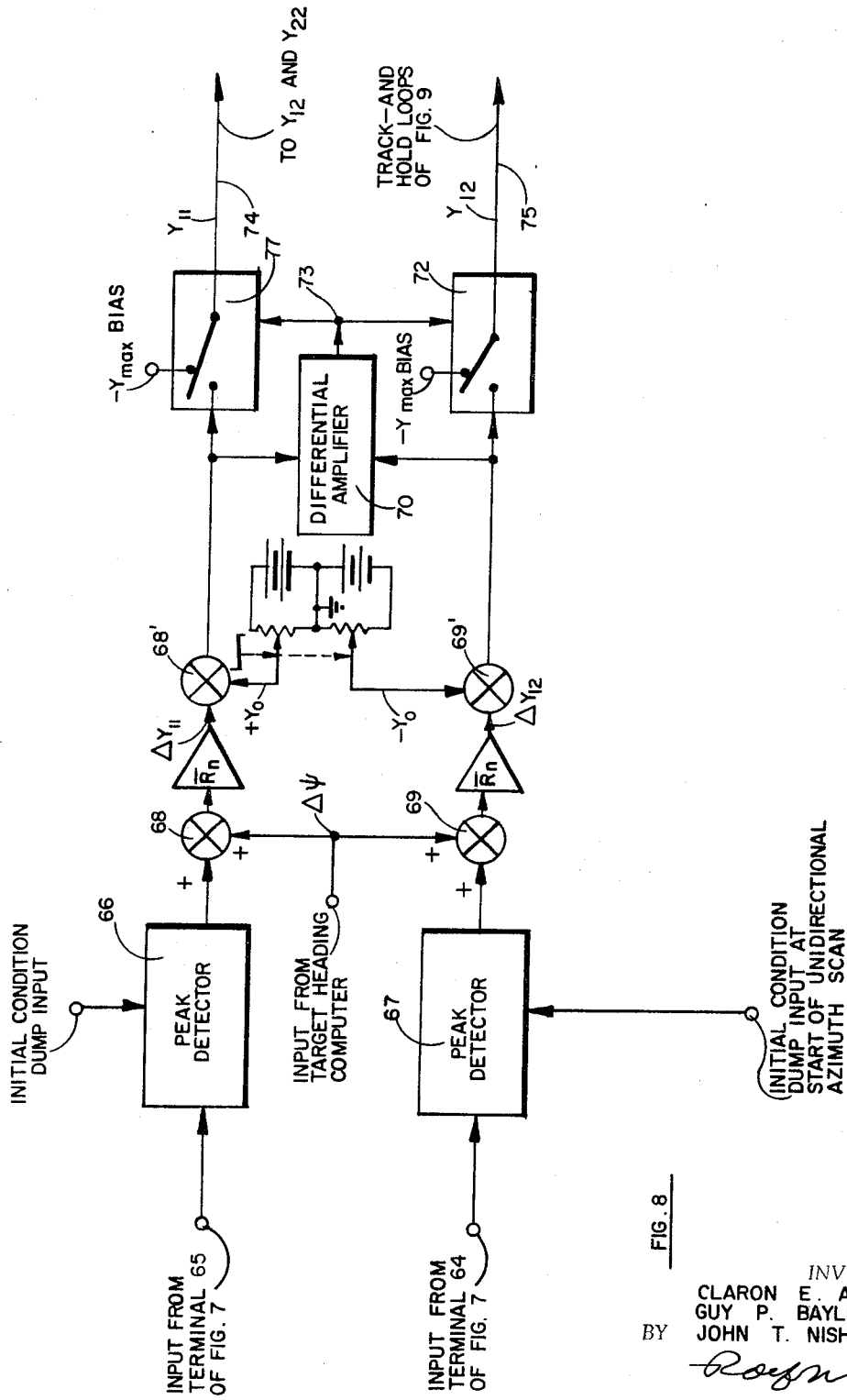

Referring to FIG. 8, there is shown a further aspect of one of the gated signal processors of FIG. 5, arranged to cooperate with the two outputs of an associated gating device, corresponding to the alternative arrangements of FIGS. 7 and 7b. There is provided a first and second peak detector 66 and 67 coupled to a respective one of terminals 65 and 64 (of FIGS. 7a and 7b) for providing that peak detected azimuth angle output associated with that switching state of switch 62 corresponding to such terminal. To the direction angle signal output of each of detectors 66 and 67 is added a signal corresponding to the direction $\Delta\psi$ of a preselected target (relative to the vehicle FRL), corresponding to direction line 30 in FIG. 2. Each of peak detectors 66 and 67 is dumped or initial condition clamped to the leftmost (or initial scan) direction angle at the beginning of each unidirectional scan, by synchronous clamping means well understood in the art. (The synchronous clamping of a peak detector in synchronism with an antenna scan mode is taught, for example, in the above noted patent application Ser. No. 540,136 filed Mar. 23, 1966, by J. J. Justus et al.) Accordingly, the cooperation of detector 66 and summing means 68 provides a maximum direction angle signal $\delta_{n2}$ indicative of the rightmost occurring $-\Delta\gamma$ signal or terrain prominence, corresponding to the sense and magnitude of $\Delta Y_{n2}$ of FIGS. 11a and 11b; while the cooperation of detector 67 and summing means 69 provide a maximum direction angle signal $\delta_{n1}$ indicative of the occurrence of a $+\Delta\gamma$ signal or right side of a valley (corresponding to the left edge of a terrain prominence and $\Delta Y_{n1}$ of FIGS. 11a and 11b). These two direction angle signals (for indicating alternatively, the directions of the edges of a prominence and the sides of a valley) may be suitably scaled or multiplied by the median range $R_n$ of the associated range bin to provide an estimated lateral displacement from the target reference line (line 30 in FIGS. 2 and 3). To each of these range-weighted direction signals is oppositely combined a clearance dimension signal, $Y_o$, in accordance with the sense convention described in connection with the illustration of FIGS. 11a and 11b. In other words, the prominence left edge dimension $\Delta Y_n$ is biased by a $-Y_o$, corresponding to a left edge clearance, and the prominence right edge dimension $\Delta Y_{n2}$ is biased by a $+Y_o$, corresponding to a right edge clearance. In other words, the dimensions, $$Y_{n1}=\Delta Y_{n1}-Y_o$$

and $Y_{n2}=\Delta Y_{n2}+Y_o$, are generated. Although a plurality of summing means is shown in FIG. 8 for effecting the combination of a peak-detected direction signal, target direction signal, and clearance signal, it is clear that a single summing amplifier may be employed and each of the two direction angle inputs thereto separately range-weighted.

The two lateral extremity measurements, $Y_{n1}$ and $Y_{n2}$ may then be combined in accordance with the teachings of Equations 7 and 7a by means of a differential amplifier 70, for example, to effect a "valley width" test, a preselected sense of the bipolar output of amplifier 70 indicating the presence of a valley of adequate width. The bipolar output of amplifier 70 is employed as a two-state switch control signal for commonly switching two double throw switches 71 and 72, each interposed at the output of a respective one of summing means 68' and 69'. Switches 71 and 72 normally connect a $-Y_{max}$ bias to the output lines 74 and 75 (for reasons which will become more apparent from a consideration of FIG. 9); however, upon the application on line 73 of a switching control signal having a sense or state corresponding to the presence of a valley of adequate width, each of switches 71 and 72 is switched to a corresponding second state, thereby connecting the output of summing means 68' and 69' to output lines 74 and 75 respectively. In this way, only those pairs of values for $Y_{n1}$ and $Y_{n2}$ are switched on which satisfactorily pass the valley-width test. It is possible during the course of a single azimuth scan that more than one such pair may exist in a given range bin. Therefore, further testing may be required to determine that valley lying in a direction nearest that of the target line 30 (of FIG. 2) and also that one of the two clearance dimensions of such valley which is closest to such reference direction, as shown more particularly in FIG. 9.

Figure 9:
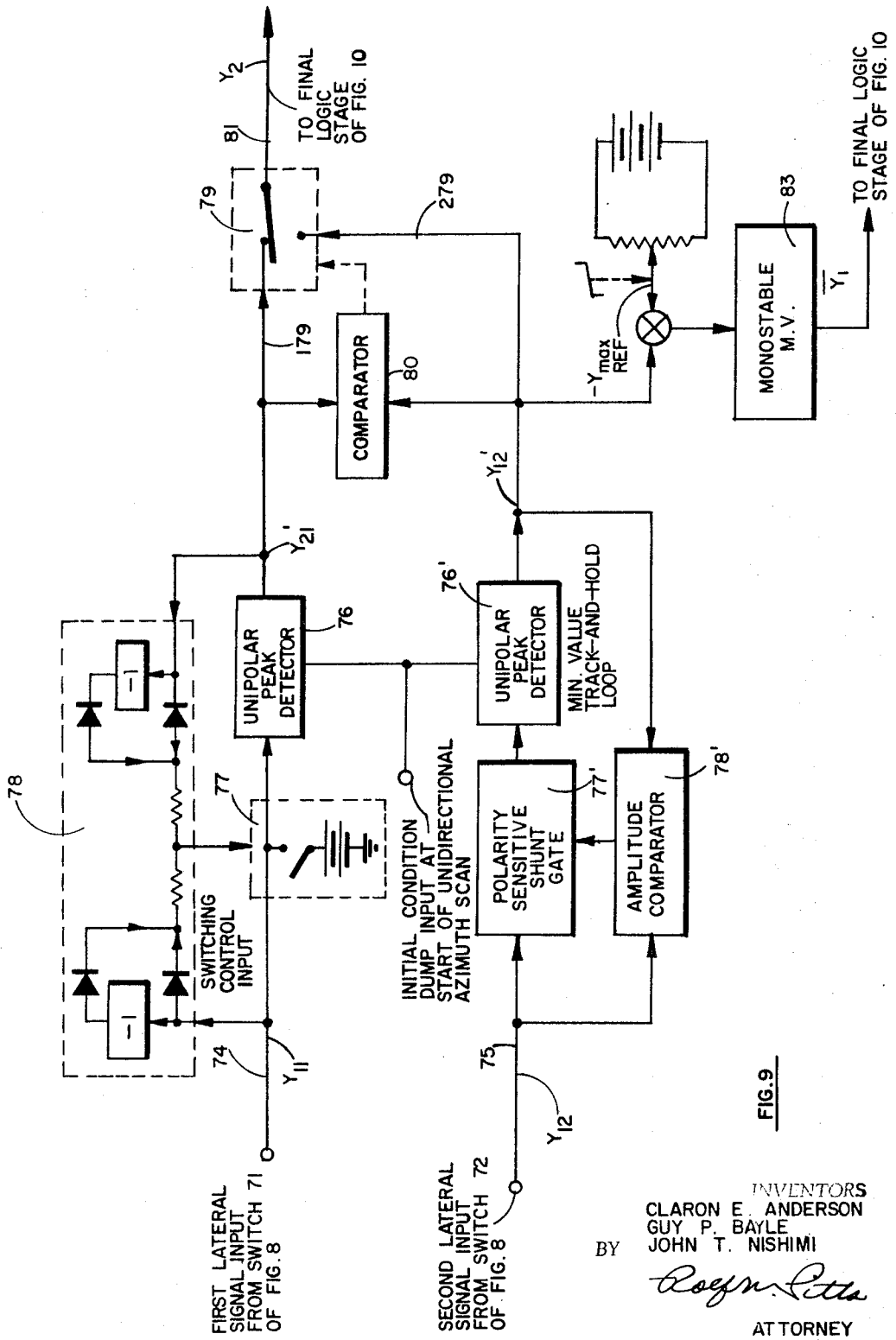

Referring to FIG. 9, there is illustrated a pair of track-and-hold circuits for detecting the least and right-handed-ness-most values $Y'_{n1}$ and $Y'_{n2}$ of those values of $Y_{n1}$ and $Y_{n2}$ for a given range bin, occurring on the output lines 74 and 75 (of FIG. 8), together with logic means for selecting the least of $Y'_{n1}$ and $Y'_{n2}$. Each of the track-and-hold circuits comprises a unipolar (positive) peak detector 76 coupled to a corresponding output line of the arrangement of FIG. 8 by means of a polarity sensitive switch or shunt gate 77. A signal amplitude comparator 78, having a first and second input respectively coupled to an output of peak detector 76 and the input on an associated one of lines 74 and 75, provides a bipolar or two-state switching control signal for control of switch 77. The construction and arrangement of amplitude comparator 78 is well understood in the art, being fully described for example in British Patent No. 814,093 issued May 27, 1959, to The Fairey Aviation Company, Limited.

Polarity-sensitive shunt gate 77 is poled or arranged to respond to the bipolar output of comparator 78 so as to apply a shunt biased input to peak detector 76, in response to a switching control input from comparator 78 having a sense indicative of an input (on line 74 for example) larger in magnitude than that of the output of peak detector 76. The sense and magnitude of the applied (left-handed) bias is preselected to prevent actuation of peak detector 76 in response thereto, in view of the initial (left hand) condition to which the detector is synchronously clamped or dumped at the beginning of each unidirectional azimuth scan of the scanning radar system of FIG. 1.

When, however, the polarity or state of the switching control signal (from comparator 78) is indicative of an input on line 74 of lesser magnitude than that of the output of peak detector 76, switch 77 feeds such lesser signal as an input to peak detector 76. Such input, while of lesser magnitude than the initial negative output of peak detector 76, is positive relative thereto (due to the left-to-right scan mode utilized in the scanning radar 20 of FIG. 1), resulting in the positive charging of peak detector 76 from such large negative value $(-Y_{max.})$ up to such lesser (positive or negative) input. Upon the charging of detector 76 to a value the magnitude of which is equal to (or less than) that of the second input to magnitude comparator 78, the switching control input to switch 77 reverses the state of switch 77 and the large negative or left-hand-bias is applied to the detector input to which the unipolar (positive) peak detector does not respond. Upon the occurrence of a subsequent input (to comparator 78) from the switch output of FIG. 8, corresponding to a higher magnitude (of positive sense) than that stored in detector 76, switch 77 does not change state. However, if such subsequent input is of a lower magnitude (either positive or negative), then switch 77 will respond to feed such input to peak detector 76. Peak detector 76 will not respond to such input where it is negative, relative to the stored signal in peak detector 76 (as where the stored signal is a minimum positive signal and the subsequent input is a minimum minus or left-hand signal). But where the stored signal is a minimum negative signal and the subsequent input is a positive signal (of lesser magnitude), then the detector charges up to such new *positive* value of *lesser* magnitude.

Hence, it is to be appreciated that each of the track-and-hold loops of FIG. 9 up-dated a respective stored signal (for a given scan interval) to a minimum value, $Y_{n1}$ and $Y'_{n2}$, having a preference for right-handedness (or positive) values.

Logic means is included in FIG. 9 for selecting the least one of $Y'_{n1}$ and $Y'_{n2}$, corresponding to the least change in course required to effect a lateral terrain avoidance maneuver, relative to the target course line. Such logic may be comprised of double throw switching means 79 having a first and second input hereto connected to a respective one of detectors 76 and 76' and having an output armature. There is also provided an amplitude comparator 80 responsive to the two inputs (on lines 179 and 279) to switch 79 for providing a bipolar or two-state signal, the state of which is indicative of which one of the two inputs is smaller. Such stwo-state signal is applied on line 180 as a switching control input to switch 79, for causing the *least* of the two outputs from detectors 76 and 76' to appear as an output $Y_n$ on line 81.

The comparator 80 of FIG. 9 may be constructed and arranged to cooperate similarly as element 78 of FIG. 9, with the polarity of the control response of switch 79 being preselected to operatively connect that one of lines 179 and 180 having the least amplitude signal, to output line 81. Such specific mechanization is to be understood to be exemplary only, however, of a number of schemes for selecting the least of two bipolar signal sources.

The selected lateral maneuver output signal, $Y_n$, from the device of FIG. 9 represents the minimum maneuver required for the preselected range bin $R_n$ associated with a set of the devices illustrated by FIGS. 7, 8 and 9. The signals $Y_n$ from each of the sets (corresponding to each of the sampled range intervals or range bins) are then processed by a final logic stage to that maximum one (of the plurality of minimum maneuvering signals) required to assure a change in course line which is safe for all range intervals sampled, as shown more particularly in FIG. 10.

Figure 10:
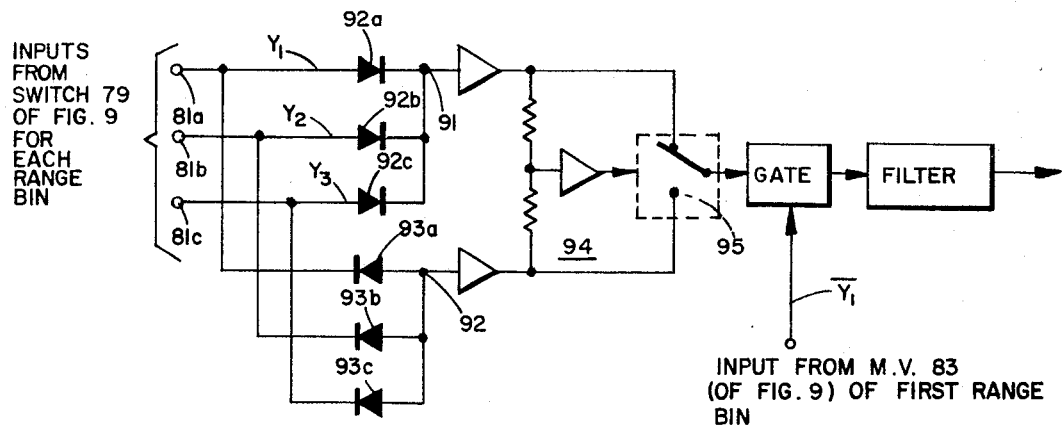

Referring now to FIG. 10, there is illustrated a final logic stage for processing of the minimum lateral maneuver signals generated for each of the sampled range intervals. Such logic has been applied to an exemplary set of three successive range intervals, corresponding to the exemplary geometry of FIG. 3; however, it is to be appreciated that the teaching is equally applicable to any number of range intervals employed. Because of the bipolar nature of the signals to be compared, a single conventional summing terminal having mutually back biasing diodes at the inputs thereof, will not suffice. Instead, two such summing terminals 91 and 92 must be employed, the diodes of each being oppositely poled relative to those of the other. In this way, the greater of a plurality of conductively poled signals is fed through an associated diode to back-bias the remaining diodes, whereby only such larger, conductively-poled signal appears as an output. For example, no negative signals applied at terminals 81 will be fed through block diodes 92 to junction 91 in FIG. 10. Also, of any positive-sensed signals among those applied as inputs to terminals 81, only the larger one, on being conducted through an associated one of positively conductively poled diodes 92, will back-bias the remaining ones of diodes 92 and will appear as the output signal of positive sense on junction 91. Similarly, the largest of any applied negative signals will appear as the output at junction 92. By combining the two oppositely poled signals appearing on terminals 91 and 92 (by means of signal combining means 94) a sum signal may be provided, the sense of which corresponds to the larger of the two signals so summed. Such sense or polarity may be used as a two-state switching control input to double throw switching means 95 for selecting the larger of the two signals on terminals 91 and 92 as an output, corresponding to the greater of the bipolar $Y_1$, $Y_2$ and $Y_3$ signals.

Where, however, the first range bin does not provide a $Y_1$ signal indicative of a situation which complies with the valley width test of Equation 7a (see FIG. 8), but instead demonstrates a situation indicative of "no valley" (left side of valley or right edge of prominence occurring at the right extremity $Y_{max}$ of the maneuvering limit within such range bin), then an indication of such condition may be used to operate a switch 96 for switching off the maximum lateral maneuver signal, whereby a zero change-of-course signal is provided. Under such circumstances, no lateral maneuver is commanded, and only vertical maneuvering signals are provided by the cooperation processor 21, gate 23 and detector 22, whereby the vehicle is controlled so as to fly "up and over" the terrain prominence.

The two-state signalling means for providing such indication of a "no valley width" tests in the first range bin is indicated in FIG. 9 by the output of a monostable multivibrator 83 responsive to the sense of the difference between the clearance dimension to the left side of a valley ($Y_{12}$) and a maximum right side dimension (say, $Y_{max}$. 100 feet). Where the left side of the valley is to the right of such right side extremity, this indicates that for all practical purposes the terrain in the first range bin is above the horizontal clearace or reference plane (of FIG. 4a) at all scanned azimuth directions, and results in a preselected state ($\overline{Y}_1$) of the switching control signal provided at the output of multivibrator 83.

Hence, it is to be understood that apparatus has been described for enabling lateral maneuvering of a space-borne vehicle, so as to avoid obstacles along the flight path thereof. Further, the means described may include a preselected preference for one of a right- or left-handedness to enable the resolution of maneuvering-logic decisions of seeming ambiguity.

Although the device has been described in terms of a particular analog device, it is clear that other equivalent analog computing elements may be substituted for specific functional ones of those illustrated, without departing from the inventive concept. Also, although an analog embodiment has been described, it is to be appreciated that the concept of the invention comprehends the utilization of digital means for performing the logic, arithmetic and signal processing functions described herein.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an azimuthally-scanning, directionally ranging system adapted for performing a terrain-following function in a space-borne vehicle, data processing means for providing lateral maneuvering signals for avoiding terrain obstacles sensed along and about a path of said vehicle, comprising
    gating means responsive to said ranging system for providing range-gated, azimuth limit-gated terrain warning signals for a plurality of successive range bins, representing terrain obstacles lying within a preselectively laterally maneuver-limited lateral sector about the heading of said vehicle; and
    means responsive to the outputs of said gating means and to the associated ranges and directions of the sensed obstacles for generating signals indicative of a lateral clearance distance in excess of a preselected minimum lateral clearance distance between said obstacles.

2. The device of claim 1 in which said gating means for providing gated signals comprises
    a plurality of range gating means, each responsive to the system trigger of said ranging system for gating-on the terrain-following signal output of said ranging system during only a mutually exclusive interval of time, said intervals corresponding to range increments representing successive ranges sensed by said ranging system; and a like plurality of azimuth limit gates as said range gating means, each limit gate associated with a mutually exclusive one of said range gating means and commonly responsive to the look-angle of said azimuthally scanning directionally ranging system for providing azimuth limit gated signals; and in which said means responsive to said gating means includes a like plurality of gated signal processors as range gating means, each signal processor responsively coupled to the output of a mutually exclusive one of said range gating means and an associated azimuth limit gate for generating signals indicative of a lateral clearance distance in excess of a preselected minimum lateral clearance between sensed terrain obstacles.

3. The device of claim 1 in which there is further provided means responsive to said last mentioned means, for generating a lateral maneuvering command signal indicative of that heading direction having associated therewith at least said minimum lateral clearance distance between sensed obstacles and representing a minimum required deviation from a selected heading direction for avoiding such sensed obstacles.

4. The device of claim 1 in which there is provided means responsive to said last mentioned means and adapted to be responsive to an inertial navigator system for generating a lateral maneuvering command signal indicative of that heading direction having associated therewith at least said minimum lateral clearance distance between sensed obstacles and representing a minimum required deviation from the heading to a preselected target for avoiding said sensed obstacles.

5. The device of claim 1 in which said means for providing gated signals for each of said range bins comprises logic means responsive to the azimuth scanning direction of said scanning system and further responsive to a selected lateral maneuver limit for providing a first switching control signal indicative of the occurrence of a scanning direction within said lateral maneuver limit;

first gating means responsive to the system trigger and the scanning direction of said ranging system for providing range-gated direction signals;

second gating means responsive to said logic means and to the terrain-following signal output of said ranging system for gating said terrain-following signal output; and double-throw switching means having a signal input coupled to the output of said first gating means and further having a control input responsive to said gated terrain-following signal output for indicating the directions associated with the edges of a detected terrain obstacle and the sides of a detected valley, alternatively.

6. The device of claim 1 in which said means for providing gated signals for each of said range bins comprises logic means responsive to the azimuth scanning direction of said scanning system and further responsive to a selected lateral maneuver limit for providing a first switching control signal indicative of the occurrence of a scanning direction within said lateral maneuver limit;

first gating means responsive to the system trigger and to the terrain-following signal output of said system for providing a range-gated terrain-following signal;

second gating means responsive to said logic means and to said gated terrain following signal for providing a range-gated azimuth-limit gated terrain following signal; and double-throw switching means having a signal input responsive to the scanning direction of said scanning system and further having a control input responsive to said range and azimuth limit gated terrain following signals for indicating the directions associated with the edges of a detected obstacle and the sides of a detected valley, alternatively.

7. The device of claim 1 in which said means for providing gated signals for each of said range bins comprises range-gating means responsive to the system trigger of said ranging system for gating-on the terrain-following signal output of said ranging system during only an interval of time corresponding to a preselected range increment;

azimuth limit gating means responsive to the look angle of said azimuthally-scanning directionally ranging system for providing azimuth limit gated signals; and means responsive to said gating means and the look angle of said azimuthally indicative of the directions associated with the edges of a detected terrain obstacles and the sides of a detected valley alternatively.

8. The device of claim 1 in which said second mentioned means includes apparatus for each of the gated range-bins, said apparatus comprising first and second range-weighting, signal-combining means responsive to the direction of a first and second side, respectively of a detected valley, each said signal-combining means further responsive to a reference direction for providing a range-weighted direction signal output;

clearance biasing means for mutually oppositely biasing said range weighted signal outputs from said first and second signal-combining means; and comparator means for determining the directional sense of a lateral clearance distance in excess of a preselected minimum lateral clearance distance.

9. The device of claim 8, in which said comparator means further includes means for determining the minimum required deviation from a reference direction for avoiding obstacles sensed in said range bin.

References Cited
UNITED STATES PATENTS

| | | | |
|---|---|---|---|
| 3,243,802 | 3/1966 | Carver | 343—7 |
| 3,302,198 | 1/1967 | Selvin et al. | 343—7 |

RODNEY D. BENNETT, *Primary Examiner.*

T. H. TUBBESING, *Assistant Examiner.*